US007501961B2

(12) United States Patent
Robinson et al.

(10) Patent No.: US 7,501,961 B2
(45) Date of Patent: Mar. 10, 2009

(54) DETERMINING A TOLL AMOUNT

(75) Inventors: Benjamin P. Robinson, Plano, TX (US); Sarath K. Balachandran, Irving, TX (US)

(73) Assignee: Rent A Toll, Ltd., Plano, TX (US)

( * ) Notice: Subject to any disclaimer, the term of this patent is extended or adjusted under 35 U.S.C. 154(b) by 0 days.

(21) Appl. No.: 11/803,933

(22) Filed: May 16, 2007

(65) Prior Publication Data

US 2007/0285279 A1 Dec. 13, 2007

Related U.S. Application Data

(60) Provisional application No. 60/801,372, filed on May 18, 2006.

(51) Int. Cl.
*G08G 1/065* (2006.01)
*G08G 1/00* (2006.01)
*G06F 7/70* (2006.01)
*G06F 19/00* (2006.01)

(52) U.S. Cl. .......................... 340/928; 701/117; 705/13

(58) Field of Classification Search ................. 348/148, 348/149; 340/928, 937; 701/117–119; 705/13, 705/400, 30, 34

See application file for complete search history.

(56) References Cited

U.S. PATENT DOCUMENTS

| | | | |
|---|---|---|---|
| 4,510,495 A | | 4/1985 | Sigrimis et al. |
| 4,546,241 A | | 10/1985 | Walton |
| 4,665,395 A | * | 5/1987 | Van Ness ................... 340/5.25 |
| 5,396,417 A | | 3/1995 | Burks et al. |
| 5,525,991 A | | 6/1996 | Nagura et al. |
| 5,602,919 A | | 2/1997 | Hurta |
| 5,805,209 A | | 9/1998 | Yuge et al. |
| 5,819,234 A | | 10/1998 | Slavin et al. |
| 5,935,190 A | | 8/1999 | Davis |
| 5,948,038 A | | 9/1999 | Daly |
| 6,087,963 A | | 7/2000 | Kobayashi et al. |
| 6,111,523 A | | 8/2000 | Mee |
| 6,175,800 B1 | | 1/2001 | Mori et al. |
| 6,181,259 B1 | | 1/2001 | Yamashita |
| 6,191,705 B1 | | 2/2001 | Oomen et al. |
| 6,195,019 B1 | | 2/2001 | Nagura |
| 6,198,913 B1 | | 3/2001 | Sung et al. |
| 6,198,987 B1 | | 3/2001 | Park et al. |
| 6,218,963 B1 | | 4/2001 | Kawanabe et al. |
| 6,233,519 B1 | | 5/2001 | Yamada |
| 6,252,523 B1 | | 6/2001 | Mostrom |
| 6,252,524 B1 | | 6/2001 | Takikita |

(Continued)

FOREIGN PATENT DOCUMENTS

GB 2414336 A * 11/2005

OTHER PUBLICATIONS

U.S. Appl. No. 11/516,380, Robinson et al.

(Continued)

*Primary Examiner*—Benjamin C Lee
*Assistant Examiner*—Jennifer Mehmood
(74) *Attorney, Agent, or Firm*—Winstead PC

(57) ABSTRACT

A system, method, and computer readable medium for determining a toll amount comprises determining a capture rate of transports at a toll location and determining the toll amount based on the capture rate.

18 Claims, 7 Drawing Sheets

U.S. PATENT DOCUMENTS

| | | | |
|---|---|---|---|
| 6,275,552 | B1 | 8/2001 | Ando |
| 6,278,935 | B1 | 8/2001 | Kaplan et al. |
| 6,285,858 | B1 | 9/2001 | Yoshida |
| 6,300,882 | B1 | 10/2001 | Inoue |
| 6,308,893 | B1 | 10/2001 | Waxelbaum et al. |
| 6,326,900 | B2 | 12/2001 | DeLine et al. |
| 6,337,639 | B1 | 1/2002 | Kojima |
| 6,340,934 | B1 | 1/2002 | Hisada |
| 6,342,844 | B1 | 1/2002 | Rozin |
| 6,373,402 | B1 | 4/2002 | Mee |
| 6,388,579 | B1 | 5/2002 | Adcox et al. |
| 6,390,365 | B1 | 5/2002 | Karasawa |
| 6,390,429 | B1 | 5/2002 | Brincat |
| 6,396,418 | B2 | 5/2002 | Naito |
| 6,411,889 | B1 | 6/2002 | Mizunuma et al. |
| 6,437,706 | B2 | 8/2002 | Sato et al. |
| 6,446,049 | B1 | 9/2002 | Janning et al. |
| 6,449,555 | B1 | 9/2002 | Ohba et al. |
| 6,459,385 | B2 | 10/2002 | Yamashita |
| 6,463,384 | B1 | 10/2002 | Kaplan et al. |
| 6,509,843 | B1 | 1/2003 | Fuyama |
| 6,538,580 | B2 | 3/2003 | Bostrom et al. |
| 6,542,815 | B1 | 4/2003 | Ishizaki et al. |
| 6,603,406 | B2 | 8/2003 | Jambhekar |
| 6,642,851 | B2 | 11/2003 | Deline et al. |
| 6,653,946 | B1 | 11/2003 | Hassett |
| 6,658,392 | B2 | 12/2003 | Yoshida |
| 6,658,775 | B1 | 12/2003 | Lanzisero |
| 6,661,352 | B2 | 12/2003 | Tiernay et al. |
| 6,683,580 | B2 | 1/2004 | Kuramoto |
| 6,683,956 | B1 | 1/2004 | Aikawa et al. |
| 6,684,155 | B1 | 1/2004 | Chen et al. |
| 6,705,521 | B1 | 3/2004 | Wu et al. |
| 6,737,986 | B2 | 5/2004 | Fuyama |
| 6,744,377 | B1 | 6/2004 | Inoue |
| 6,754,369 | B1 * | 6/2004 | Sazawa ...................... 382/105 |
| 6,756,915 | B2 | 6/2004 | Choi |
| 6,774,810 | B2 | 8/2004 | Deline |
| 6,791,475 | B2 | 9/2004 | Yamashita |
| 6,796,499 | B1 | 9/2004 | Wang |
| 6,816,707 | B1 | 11/2004 | Barker et al. |
| 6,834,267 | B1 | 12/2004 | Fuyama |
| 6,856,820 | B1 | 2/2005 | Kolls |
| 6,883,710 | B2 | 4/2005 | Chung |
| 6,909,876 | B2 | 6/2005 | Higashino et al. |
| 6,920,379 | B2 | 7/2005 | Miyamoto |
| 6,937,162 | B2 | 8/2005 | Tokitsu et al. |
| 7,053,793 | B2 | 5/2006 | Tajima et al. |
| 2001/0019307 | A1 | 9/2001 | Sato et al. |
| 2001/0025251 | A1 | 9/2001 | Konishi et al. |
| 2001/0026228 | A1 | 10/2001 | Naito |
| 2001/0052880 | A1 | 12/2001 | Kuramoto |
| 2002/0002534 | A1 | 1/2002 | Davis et al. |
| 2002/0004741 | A1 | 1/2002 | Yoshida |
| 2002/0008638 | A1 | 1/2002 | Yamashita |
| 2002/0018005 | A1 | 2/2002 | Fuyama |
| 2002/0032506 | A1 | 3/2002 | Tokitsu et al. |
| 2002/0052837 | A1 | 5/2002 | Bouthors |
| 2002/0067291 | A1 | 6/2002 | Ikeda |
| 2002/0072963 | A1 | 6/2002 | Jonge |
| 2002/0080048 | A1 | 6/2002 | Choi |
| 2002/0089431 | A1 | 7/2002 | Fuyama |
| 2002/0097178 | A1 | 7/2002 | Thomas et al. |
| 2002/0105440 | A1 | 8/2002 | Bostrom et al. |
| 2002/0111851 | A1 | 8/2002 | Folkers |
| 2002/0115410 | A1 | 8/2002 | Higashino et al. |
| 2002/0145039 | A1 | 10/2002 | Carroll |
| 2002/0145542 | A1 | 10/2002 | Yamashita |
| 2002/0178050 | A1 | 11/2002 | Sone |
| 2002/0194137 | A1 | 12/2002 | Park et al. |
| 2003/0001755 | A1 | 1/2003 | Tiernay et al. |
| 2003/0026430 | A1 | 2/2003 | Aikawa et al. |
| 2003/0033083 | A1 | 2/2003 | Nakashima et al. |
| 2003/0046145 | A1 | 3/2003 | Miao |
| 2003/0067396 | A1 | 4/2003 | Hassett |
| 2003/0069784 | A1 | 4/2003 | Banerjee et al. |
| 2003/0105662 | A1 | 6/2003 | Koketsu et al. |
| 2003/0109223 | A1 | 6/2003 | Toyama |
| 2003/0110075 | A1 | 6/2003 | Shioda et al. |
| 2003/0112125 | A1 | 6/2003 | Saegrov |
| 2003/0115095 | A1 | 6/2003 | Yamauchi |
| 2003/0189498 | A1 * | 10/2003 | Kakihara et al. ............ 340/928 |
| 2003/0200227 | A1 | 10/2003 | Ressler |
| 2004/0004120 | A1 | 1/2004 | Kojima |
| 2004/0008514 | A1 | 1/2004 | Lee et al. |
| 2004/0019412 | A1 | 1/2004 | Miyamoto |
| 2004/0046019 | A1 | 3/2004 | Kojima |
| 2004/0083130 | A1 | 4/2004 | Posner et al. |
| 2004/0153401 | A1 | 8/2004 | Gila et al. |
| 2004/0162788 | A1 | 8/2004 | Sakamoto |
| 2004/0174272 | A1 | 9/2004 | Lin |
| 2004/0178929 | A1 | 9/2004 | Toyama |
| 2004/0206817 | A1 | 10/2004 | Grant |
| 2004/0212518 | A1 | 10/2004 | Tajima et al. |
| 2004/0227616 | A1 | 11/2004 | Lafferty |
| 2004/0236685 | A1 | 11/2004 | Gila |
| 2004/0245302 | A1 | 12/2004 | McNicholas |
| 2004/0263356 | A1 | 12/2004 | Wu et al. |
| 2004/0266500 | A1 | 12/2004 | Gila et al. |
| 2005/0005488 | A1 | 1/2005 | Burke |
| 2005/0010478 | A1 | 1/2005 | Gravelle |
| 2005/0033505 | A1 | 2/2005 | Zatz |
| 2005/0034340 | A1 | 2/2005 | Burke |
| 2005/0040221 | A1 | 2/2005 | Schwarz, Jr. |
| 2005/0071175 | A1 | 3/2005 | Gila et al. |
| 2005/0086100 | A1 * | 4/2005 | Yanagisawa et al. .......... 705/13 |
| 2005/0097018 | A1 | 5/2005 | Takida |
| 2005/0102211 | A1 | 5/2005 | Freeny |
| 2005/0119010 | A1 | 6/2005 | Yasukawa |
| 2005/0157677 | A1 | 7/2005 | Dowling |
| 2005/0159133 | A1 | 7/2005 | Hasan et al. |
| 2005/0168351 | A1 | 8/2005 | Saze et al. |
| 2005/0168352 | A1 | 8/2005 | Tomer |
| 2005/0169227 | A1 | 8/2005 | Dowling |
| 2005/0169228 | A1 | 8/2005 | Dowling |
| 2005/0170824 | A1 | 8/2005 | Dowling |
| 2005/0170825 | A1 | 8/2005 | Dowling |
| 2005/0179522 | A1 | 8/2005 | Saegrov |
| 2005/0187701 | A1 | 8/2005 | Baney |
| 2005/0195841 | A1 | 9/2005 | Dowling |
| 2005/0195842 | A1 | 9/2005 | Dowling |
| 2005/0197976 | A1 | 9/2005 | Tuton et al. |
| 2005/0198199 | A1 | 9/2005 | Dowling |
| 2005/0216187 | A1 | 9/2005 | Hartinger |
| 2005/0270178 | A1 * | 12/2005 | Ioli ......................... 340/932.2 |
| 2005/0279831 | A1 | 12/2005 | Robinson et al. |
| 2007/0124197 | A1 | 5/2007 | Robinson et al. |
| 2007/0124198 | A1 | 5/2007 | Robinson et al. |
| 2007/0124199 | A1 | 5/2007 | Robinson et al. |
| 2007/0192177 | A1 | 8/2007 | Robinson et al. |

OTHER PUBLICATIONS

U.S. Appl. No. 11/516,376, Robinson.
U.S. Appl. No. 11/651,414, Robinson et al.
U.S. Appl. No. 11/580,527, Robinson.
U.S. Appl. No. 11/810,751, Robinson et al.
U.S. Appl. No. 11/640,550, Robinson et al.
U.S. Appl. No. 11/640,586, Robinson et al.
U.S. Appl. No. 11/810,752, Robinson et al.
"Overview of Meeting Proceedings", 2004 IBTTA Technology Committee, Spring Technology Workshop, Miami, Florida, USA, (4 pages).

Dick Schnacke, "The 5.9 GHZ DSRC Prototype Development Program", IBTTA Technology Workshop, Madrid, Spain, Nov. 14, 2004, (37 pages).

U.S. Appl. No. 11/985,985, Robinson et al.

U.S. Appl. No. 11/903,687, Robinson et al.

Mehmood, Jennifer, "International Search Report for PCT/US2004/011816" as mailed Jun. 2, 2008 (3 pages).

* cited by examiner

DETERMINING A TOLL AMOUNT

CROSS-REFERENCE TO RELATED APPLICATIONS

The present patent application is related to and claims priority from U.S. provisional patent application No. 60/801,372, filed May 18, 2006, entitled TOLL FEE SYSTEM AND METHOD FOR CALCULATING VIDEO TOLLS, the entire contents of which are incorporated by reference herein.

The present patent application is related to U.S. Provisional Patent Application No. 60/757,406, titled Online Travel Provider Toll System And Method, filed on Jan. 9, 2006, U.S. Provisional Patent Application No. 60/757,347, titled Electronic Toll Payment System And Method For Third Party Operated Vehicles Utilizing An Onboard Unit, filed on Jan. 9, 2006, U.S. Provisional Patent Application No. 60/757,405, titled GPS Toll System And Method For Collection Of Rental Vehicle Tolls, filed on Jan. 9, 2006, U.S. Provisional Patent Application No. 60/726,300, titled Toll Fee System And Method Using Prepaid Toll Pass, filed on Oct. 13, 2005, U.S. Provisional Patent Application No. 60/759,937, titled Business Process For Toll Fee System And Method For Vehicle Registration, Invoicing, Opt-In Services, And Toll Violations, filed on Jan. 18, 2006, U.S. Provisional Patent Application No. 60/763,097 titled Method And System For Toll Collection With Optional Service Capabilities, filed on Jan. 27, 2006, U.S. Non-Provisional patent application Ser. No. 11/125,521, titled Toll Fee System And Method, filed on May 10, 2005, to U.S. Non-Provisional Patent Application Docket No. RTL008, titled System, Method, And Computer Readable Medium For Billing, filed on Sep. 6, 2006, to U.S. Non-Provisional Patent Application, titled System, Method, And Computer Readable Medium For Billing Tolls, filed on Sep. 6, 2006, to U.S. Non-Provisional Patent Application, titled System, Method And Computer Readable Medium For Toll Service Activation And Billing, filed on Oct. 13, 2006, to U.S. Non-Provisional Patent Application Docket No. RTL030, titled System, Method And Computer Readable Medium For Billing Based On A Duration Of A Service Period, filed on Oct. 13, 2006, to U.S. Non-Provisional Patent Application, tilted Paying Tolls Utilizing A Financial Service Provider And Paying A Subscription Or License Fee, filed on Dec. 18, 2006, and to U.S. Non-Provisional Patent Application, titled Transferring Toll Data From A Third Party Operated Transport To A User Account, filed on Dec. 18, 2006, the entire contents of each of which are incorporated by reference herein

BACKGROUND OF THE INVENTION

The present invention relates generally to toll fee tracking systems and methods and, more particularly, but not by way of limitation, to toll fee tracking systems and methods for automatic, non-contact, high-speed toll fee tracking and payment of vehicular tolls using automated vehicle identification (AVI) techniques such as Video, GPS, DSRC, RFID, etc.

History of Related Art

The crowding of highways within metropolitan areas has resulted in the development of additional traffic arteries known as toll roads. Toll roads have become increasingly popular, however, they require the payment of a toll fee for use by vehicular occupants. The collection of tolls by conventional means has had a negative effect upon highway throughput and safety. Congestion and long backups on toll plazas are becoming more common. Such conditions involve a significant economic cost, through lost time and reduced productivity. Moreover, serious accidents at toll plazas, caused by operators or mechanical failures, have also increased in frequency.

Today, those individuals who frequently use toll roads are now prone to the purchase of toll fee tracking device. The toll fee tracking device allows the vehicular occupant to bypass the cash only toll gate and, in many instances, the vehicle can maintain its normal speed as it traverses the toll gate wherein the passage of the toll fee tracking device is recorded. The popularity of the toll fee tracking device has expanded to the point that the normal user of the toll fee tracking device can be frustrated by the lines at toll gates when the toll fee tracking device is not available. Unavailability of a toll fee tracking device can be for numerous reasons, not the least of which is the use of rental cars.

One of the major issues with rental cars or third party operated vehicles is maintaining and managing a large population of vehicles with the toll fee tracking devices attached to such vehicles. As a result, toll authorities have initiated a program utilizing Violation Enforcement Systems (VES) to capture toll usage from third party operated vehicles. The VES utilizes the video toll technology (VTOLLS). While capturing video tolls (VTOLLS) using VES helps to minimize violations, the VES system fails to improve the overall revenues of the toll authority. Using VES to capture toll usage from third party operated vehicles reduces the amount of lost revenue capture by toll authorities. However, Toll Authorities are still losing significant amount of revenues when VES don't capture a valid license plate string whether that be from weather conditions, visibility conditions, damaged license plates, unreadable licenses plates or a multitude of other reasons that prohibit the capturing of a valid license plate to therefore bill the toll violator. These toll violators include both 3$^{rd}$ party operated vehicles such as rental cars, but the majority of toll violators are local vehicle owners.

The toll fee tracking devices using RFID technology have a capture rate of around 90%-99% of the actual tolls and are an efficient means for capturing revenue for toll authorities. On the contrary, VES system capturing revenue for toll authority is much less effective. As a result, utilizing VES systems to capture toll usage from third party operated vehicles and local vehicles significantly reduce the toll authority revenue. The reason for the low efficiency rate in the capture of VTOLLS is due to several factors which may be, for example, dirt, grime, mud, snow, ice on license plates. Other factors may also aid to the low efficiency rate in the capture of VTOLLS such as, for example, damaged license plates.

Therefore, there is a need for a method and system for capturing a greater percentage of uncaptured tolls to improve the overall revenues of the toll authority.

SUMMARY OF THE INVENTION

The present invention toll fee tracking system comprising a toll processing unit applying a multiplier to captured toll usage data. The above summary of the invention is not intended to represent each embodiment or every aspect of the present invention.

In one embodiment, a method for determining a toll amount, comprises determining a capture rate of transports at a toll location and determining the toll amount based on the capture rate.

In another embodiment, a computer readable medium comprises instructions for: determining a capture rate of transports at a toll location, determining a multiplier and determining a toll amount based on the capture rate and the multiplier.

In a further embodiment, a system for determining a toll amount comprises a first entity that determines a capture rate of transports at each toll location, wherein the first entity is at least one of: a toll authority and a toll collection entity and a second entity that determines the toll amount based on the capture rate, wherein the second entity is at least one of: the toll authority and the toll rental entity.

DETAILED DESCRIPTION OF THE INVENTION

Embodiments of the present invention provide a system, method, and computer readable medium for improving the overall revenues of the toll authority. As an exemplary embodiment, assume 1000 unsubscribed users pass through gates of the toll authority per day. Out of the 1000 vehicle users, 90% of the 1000 users are actual cash payers at the toll authority while the remaining 10% of the 1000 users are violators. If the toll authority charges $1, than $900 would be paid by cash payers. If the capturing efficiency of the VES is 40%, then 40% of 100 (violators) would be captured by VES. Ultimately, the toll authority would receive $900 from the cash payers and an additional $40 collected from the violators. Thus, the remaining $60 is unaccounted for and is due to the poor video capture rate of the VES.

Figure 1:
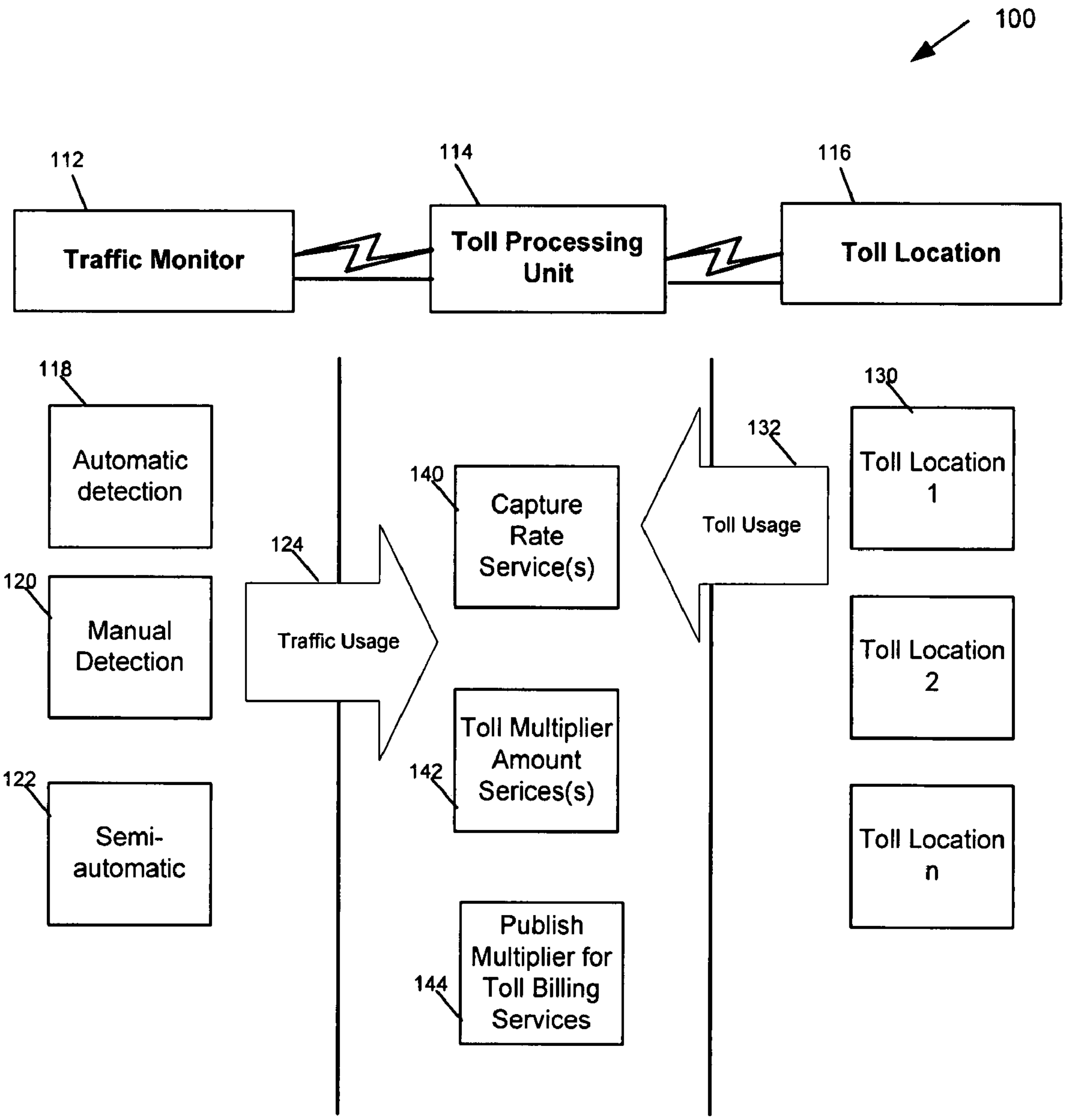
FIG. 1 illustrates a system diagram according to an embodiment of the disclosure.

Referring now to FIG. 1, a system 100 includes a traffic monitor 112, a toll processing unit (TPU) 114, and a toll location 116 which are communicably coupled to one another via a wired connection, a wireless connection, and/or a combination of the two. The traffic monitor 112, detects traffic usage 124 of a transport in any of a number of ways including: automatically 118, manually 120, semi-automatically 122, or in any other manner. The transport is at least one of: a vehicle, a motorcycle, a bus, a train, a plane, a train, a boat, and any device that provides transportation. The toll location 116, provides toll usage 132 of the transport as the transport uses or accesses one or more toll locations which may be a specific toll lane, a toll gate, a toll plaza, a wireless toll collection system, a toll region, and a toll system in its entirety. The traffic usage 124 and the toll usage 132 are sent to the TPU 114 which calculates a toll amount based on at least one of: a capture rate 140, and a toll multiplier 142 amount. TPU 114 may be shared by multiple toll roads, toll locations, toll lanes and toll authorities. Multiple Toll Monitors 112 communicate with the TPU 114 for deriving capture rate.

Figure 2:
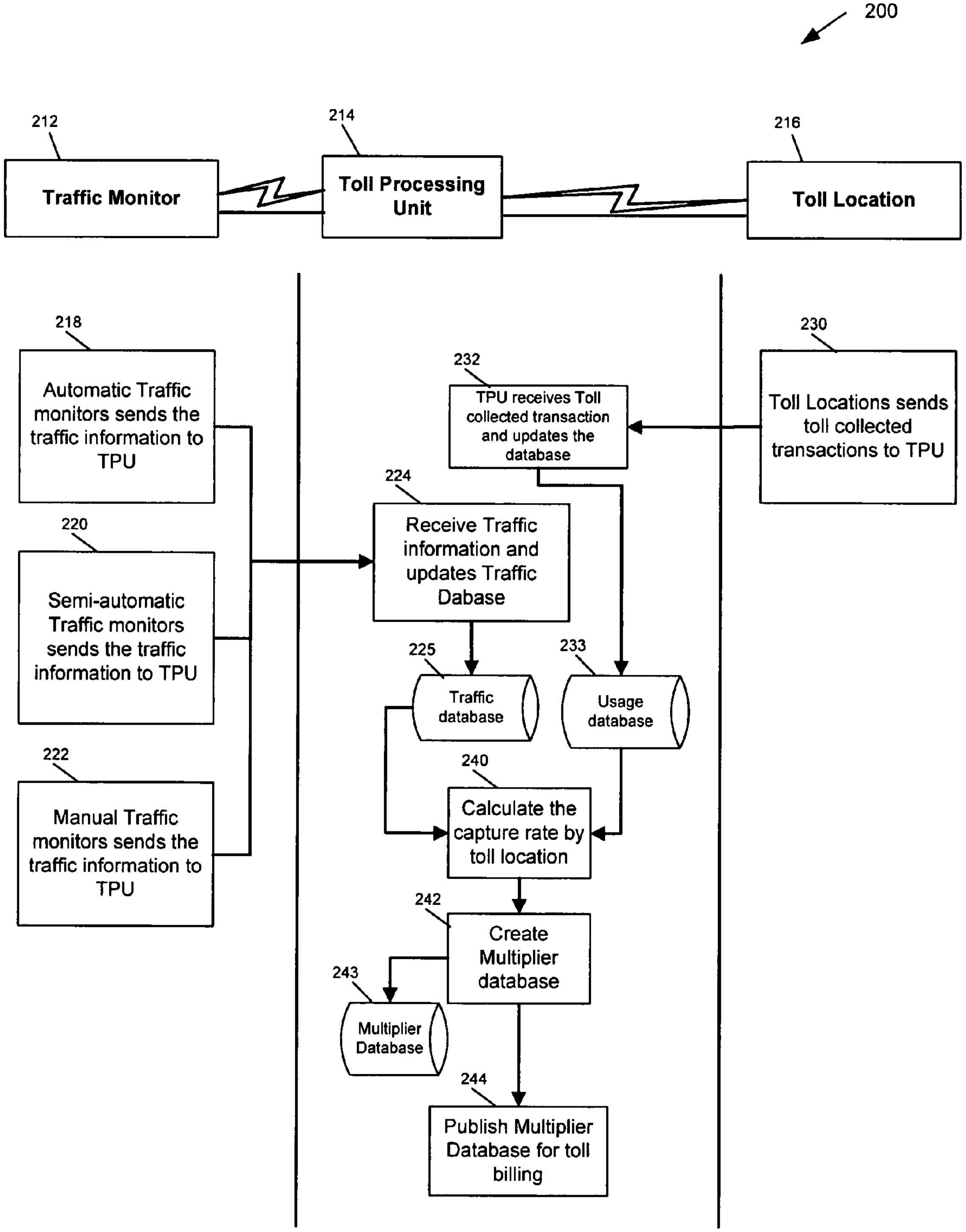
FIG. 2 illustrates a system diagram and message flow according to an embodiment of the disclosure.

Referring now to FIG. 2, a system 200 includes a traffic monitor 212, a toll processing unit (TPU) 214, and a toll location 216 which are communicably coupled to one another via a wired connection, a wireless connection, and/or a combination of the two. The traffic monitor 212 sends traffic information to the TPU 214 in a number of ways including: automatically 218, semi-automatically 220, and manually 222 in a periodic or non-periodic manner. The TPU 214 receives this information 224 and updates a traffic database 225. The toll location 216 sends 230 toll collected transactions to the TPU 214 in a periodic or non-periodic manner. The TPU receives 232 the toll collected transactions and updates a usage database 233. The information from the traffic database 225 and from the usage database 233 are used to calculate 240 a capture rate by a toll location which is used to create 242 a multiplier database 243. This database 243 (or the information contained in this database), can be published and used for toll billing in addition for other services.

Figure 3:
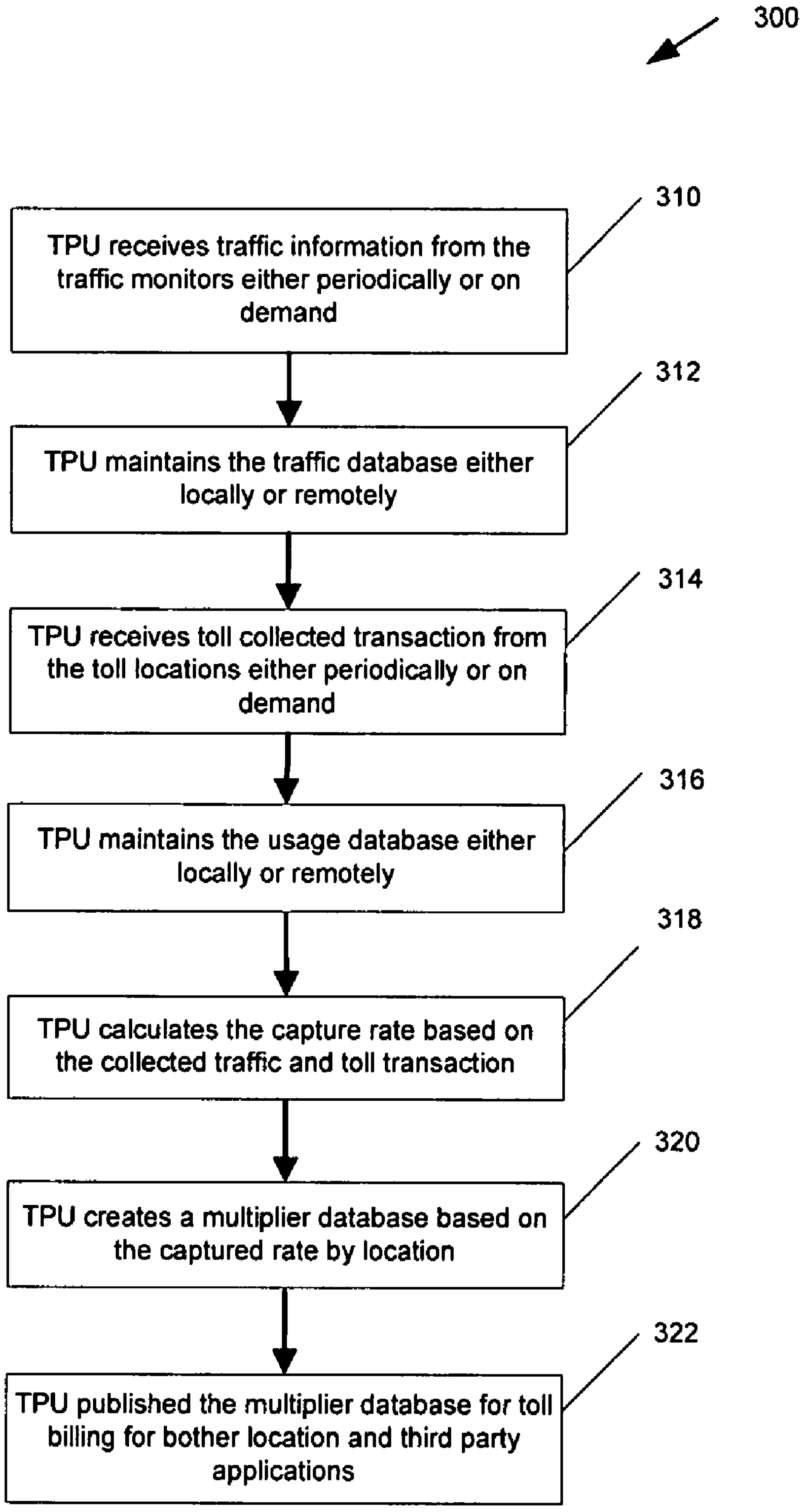
FIG. 3 illustrates a flow chart of actions involving a toll processing unit according to an embodiment of the disclosure.

Referring now to FIG. 3, a flow chart 300 describes various actions that a TPU can perform (but may not necessarily perform) including receiving 310 traffic information from the traffic monitors either periodically or on-demand, maintaining 312 the traffic database either locally or remotely, receiving 314 toll collected transaction(s) from the toll location(s) either periodically or on-demand, maintaining 316 the usage database either locally or remotely, calculating 318 the capture rate based on the collected traffic and toll transaction, creating 318 a multiplier database based on the captured rate by location, and publishing 322 the multiplier database for toll billing for bother location and third party applications. The steps that may be performed by the TPU may be performed in any order other than the order depicted and described.

Figure 4:
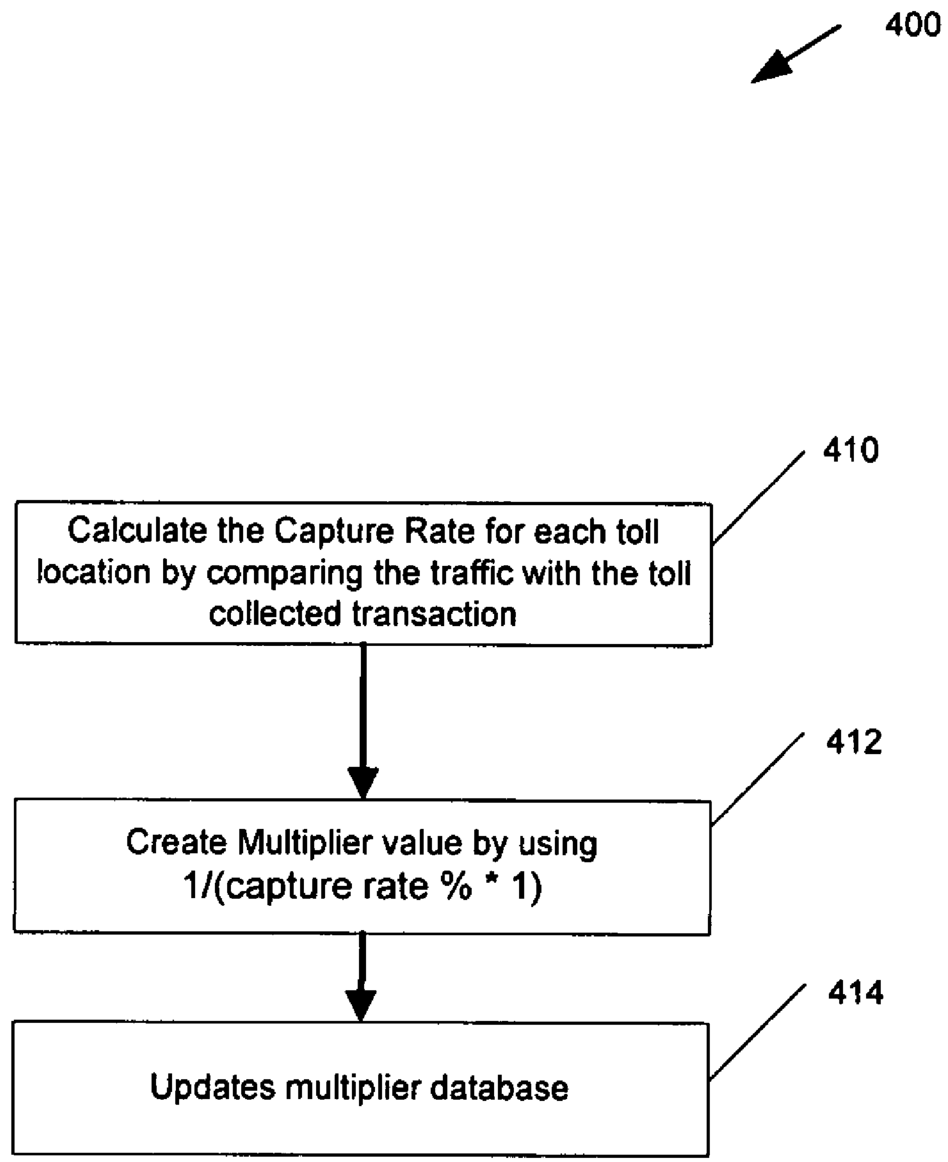
FIG. 4 illustrates a flow chart describing a capture rate calculation according to an embodiment of the disclosure.

Referring now to FIG. 4, a flow chart 400 describes a capture rate calculation and includes calculating 410 a capture rate for each toll location by comparing the traffic with the toll collected transaction, creating 412 a multiplier value by using 1/(capture rate %*1), and updating 414 a multiplier database. Some of these steps may not be performed and the ones that are, may be performed in any order other than the order depicted and described.

Figure 5:
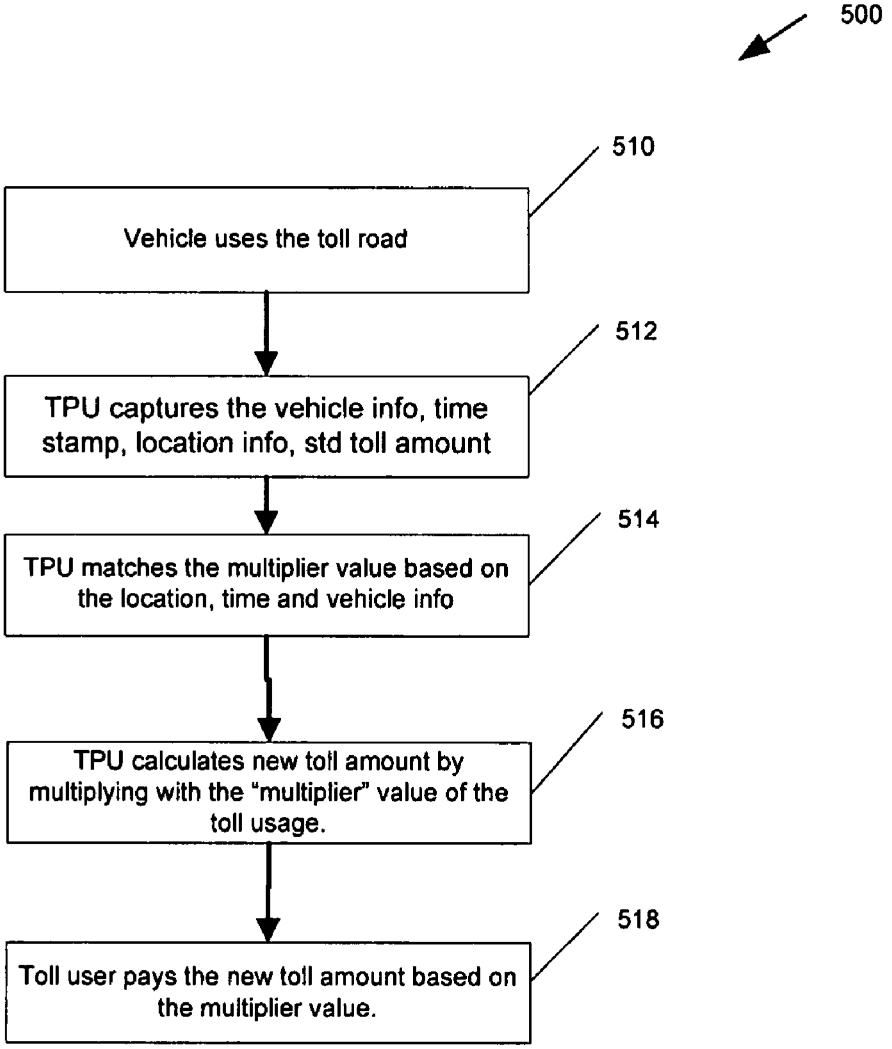
FIG. 5 illustrates a flow chart describing actions involving a third party entity according to an embodiment of the disclosure.

Referring now FIG. 5, a flow diagram 500 for calculating the toll amount using a multiplier model is shown. When a transport uses a toll road, the TPU receives the toll usage such as location information, direction, vehicle information, time stamp, and the like from the toll lane controller or toll plaza 512. The TPU receives the toll usage information using either a pull or push methodology via a wired and/or wireless mechanism. The TPU uses the collected information from the toll plaza and finds the matching multiplier value using the capture rate at the toll location 514. A multiplier database can be maintained locally or remotely and can be accessed by at least one of the following: a toll lane/toll plaza, a toll authority, and a TPU. The TPU uses the multiplier value to calculate the toll amount the toll usage 516. This calculated information can be later transferred to the toll plaza, toll authority, external party, customer, or any other person or entity. The customer or receiving entity can then pay the calculated toll price for the toll usage 518.

Figure 6:
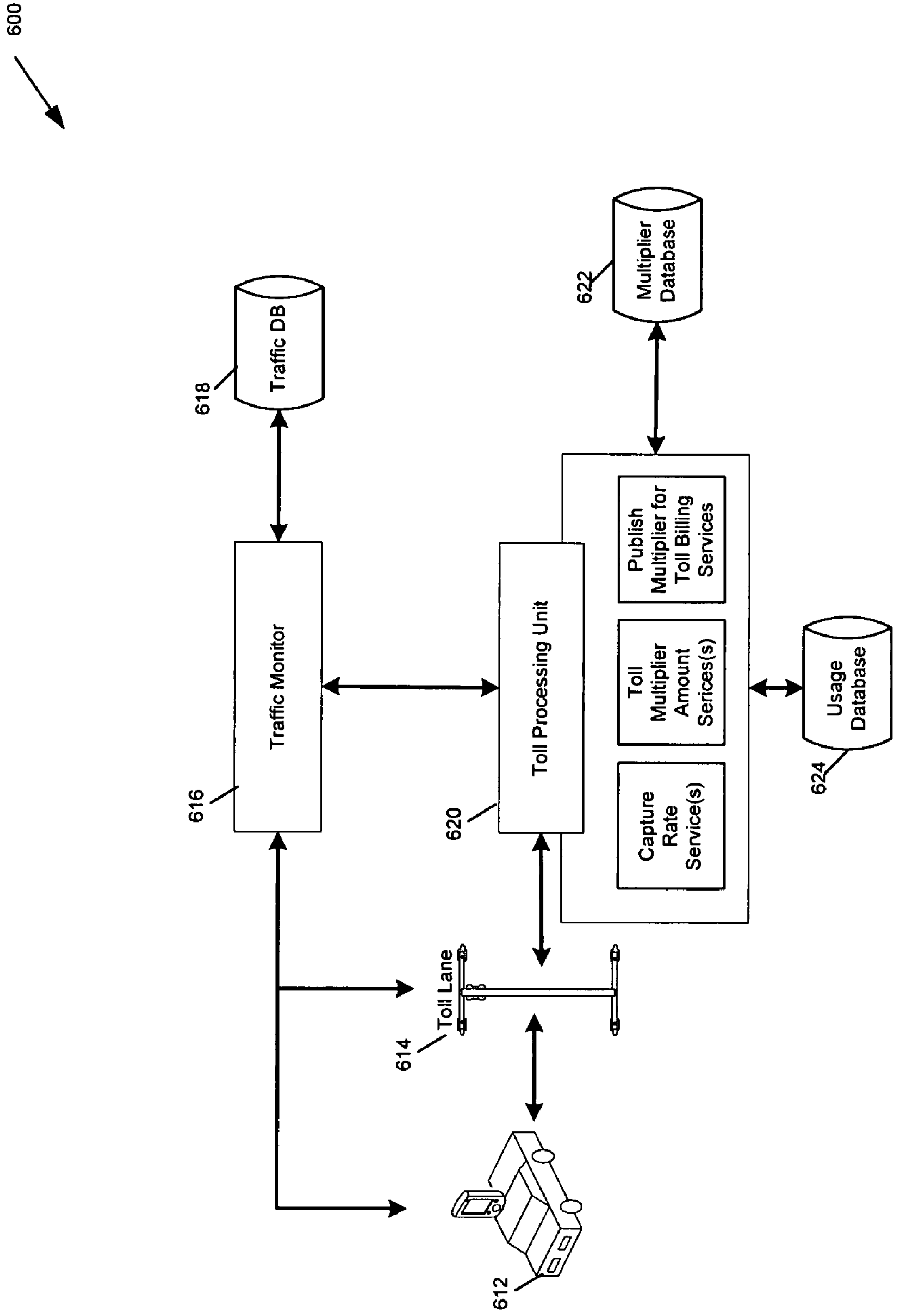
FIG. 6 illustrates another system diagram according to an embodiment of the disclosure.

Referring now FIG. 6, a system 600 for calculating a toll amount using multiplier model is shown. A traffic monitor 616 captures the toll traffic information either manually or using an automatic technique and builds a toll traffic database 618 periodically or non-periodically. A TPU 620 uses this information to predict the capture rate information at each toll location at a specific instance. For example, on a rainy day, a snowy day, during a peek time, etc. This knowledge database is used to build a "multiplier database" 622 which provides a value to be multiplied with the existing toll amount to capture lost revenue due to technical or physical limitations. The multiplier database 622 is created and maintained by the TPU 620 which uses a toll billing service component to calculate the toll amount for any toll usage. When a transport 612 uses the toll plaza/toll facility 614, the TPU captures the toll usage and calculates the toll amount for the toll usage via a toll usage database 624.

Embodiments of the present invention utilize a multiplier model based upon a capture rate of the VES. As an example, a particular toll road such as, the newer George Bush Turnpike may have a higher capture rate (using video, for example) as compared to the older Dallas North Tollway. Thus, the present invention utilizes different multipliers based upon the capture rate of the various toll roads, toll plazas, toll gates or entire toll systems which may be based in part on the level of technology in the toll booth areas of the toll roads. Using the multipliers allows for a greater percentage of actual tolls to be collected and using different multipliers for different toll roads based upon the capture rate of the various toll roads establishes an element of inherent fairness in the charges applied. When a vehicle passes through a toll gate/lane of the toll authority, the VES captures the vehicle information and a toll processing unit applies a multiplier to each captured toll. The following table shows a system, method, and computer readable medium for capturing 100% of the actual tolls and a payout to a toll authority (TA) when a VES is used for toll usage capture:

| VTOLL Capture | Multiplier | TA Payout |
|---|---|---|
| 10% | 10.00 | 1000 |
| 11% | 9.09 | 1000 |
| 12% | 8.33 | 1000 |
| 13% | 7.69 | 1000 |
| 14% | 7.14 | 1000 |
| 15% | 6.67 | 1000 |
| 16% | 6.25 | 1000 |
| 17% | 5.88 | 1000 |
| 18% | 5.56 | 1000 |
| 19% | 5.26 | 1000 |
| 20% | 5.00 | 1000 |
| 21% | 4.76 | 1000 |
| 22% | 4.55 | 1000 |
| 23% | 4.35 | 1000 |
| 24% | 4.17 | 1000 |
| 25% | 4.00 | 1000 |
| 26% | 3.85 | 1000 |
| 27% | 3.70 | 1000 |
| 28% | 3.57 | 1000 |
| 29% | 3.45 | 1000 |
| 30% | 3.33 | 1000 |
| 31% | 3.23 | 1000 |
| 32% | 3.13 | 1000 |
| 33% | 3.03 | 1000 |
| 34% | 2.94 | 1000 |
| 35% | 2.86 | 1000 |
| 36% | 2.78 | 1000 |
| 37% | 2.70 | 1000 |
| 38% | 2.63 | 1000 |
| 39% | 2.56 | 1000 |
| 40% | 2.50 | 1000 |
| 41% | 2.44 | 1000 |
| 42% | 2.38 | 1000 |
| 43% | 2.33 | 1000 |
| 44% | 2.27 | 1000 |
| 45% | 2.22 | 1000 |
| 46% | 2.17 | 1000 |
| 47% | 2.13 | 1000 |
| 48% | 2.08 | 1000 |
| 49% | 2.04 | 1000 |
| 50% | 2.00 | 1000 |
| 51% | 1.96 | 1000 |
| 52% | 1.92 | 1000 |
| 53% | 1.89 | 1000 |
| 54% | 1.85 | 1000 |
| 55% | 1.82 | 1000 |
| 56% | 1.79 | 1000 |
| 57% | 1.75 | 1000 |
| 58% | 1.72 | 1000 |
| 59% | 1.69 | 1000 |
| 60% | 1.67 | 1000 |
| 61% | 1.64 | 1000 |
| 62% | 1.61 | 1000 |
| 63% | 1.59 | 1000 |
| 64% | 1.56 | 1000 |
| 65% | 1.54 | 1000 |
| 66% | 1.52 | 1000 |
| 67% | 1.49 | 1000 |
| 68% | 1.47 | 1000 |
| 69% | 1.45 | 1000 |
| 70% | 1.43 | 1000 |
| 71% | 1.41 | 1000 |
| 72% | 1.39 | 1000 |
| 73% | 1.37 | 1000 |
| 74% | 1.35 | 1000 |
| 75% | 1.33 | 1000 |
| 76% | 1.32 | 1000 |
| 77% | 1.30 | 1000 |
| 78% | 1.28 | 1000 |
| 79% | 1.27 | 1000 |
| 80% | 1.25 | 1000 |
| 81% | 1.23 | 1000 |
| 82% | 1.22 | 1000 |
| 83% | 1.20 | 1000 |
| 84% | 1.19 | 1000 |
| 85% | 1.18 | 1000 |
| 86% | 1.16 | 1000 |
| 87% | 1.15 | 1000 |
| 88% | 1.14 | 1000 |
| 89% | 1.12 | 1000 |
| 90% | 1.11 | 1000 |
| 91% | 1.10 | 1000 |
| 92% | 1.09 | 1000 |
| 93% | 1.08 | 1000 |
| 94% | 1.06 | 1000 |
| 95% | 1.05 | 1000 |
| 96% | 1.04 | 1000 |
| 97% | 1.03 | 1000 |
| 98% | 1.02 | 1000 |
| 99% | 1.01 | 1000 |
| 100% | 1.00 | 1000 |

The formula used to determine the multiplier is as follows:

Multiplier=1/(Toll Capture Rate %*1)

For example, if M=Multiplier for TOLLS and X=TOLL Capture rate %, then M=1/(X*1).

Figure 7:
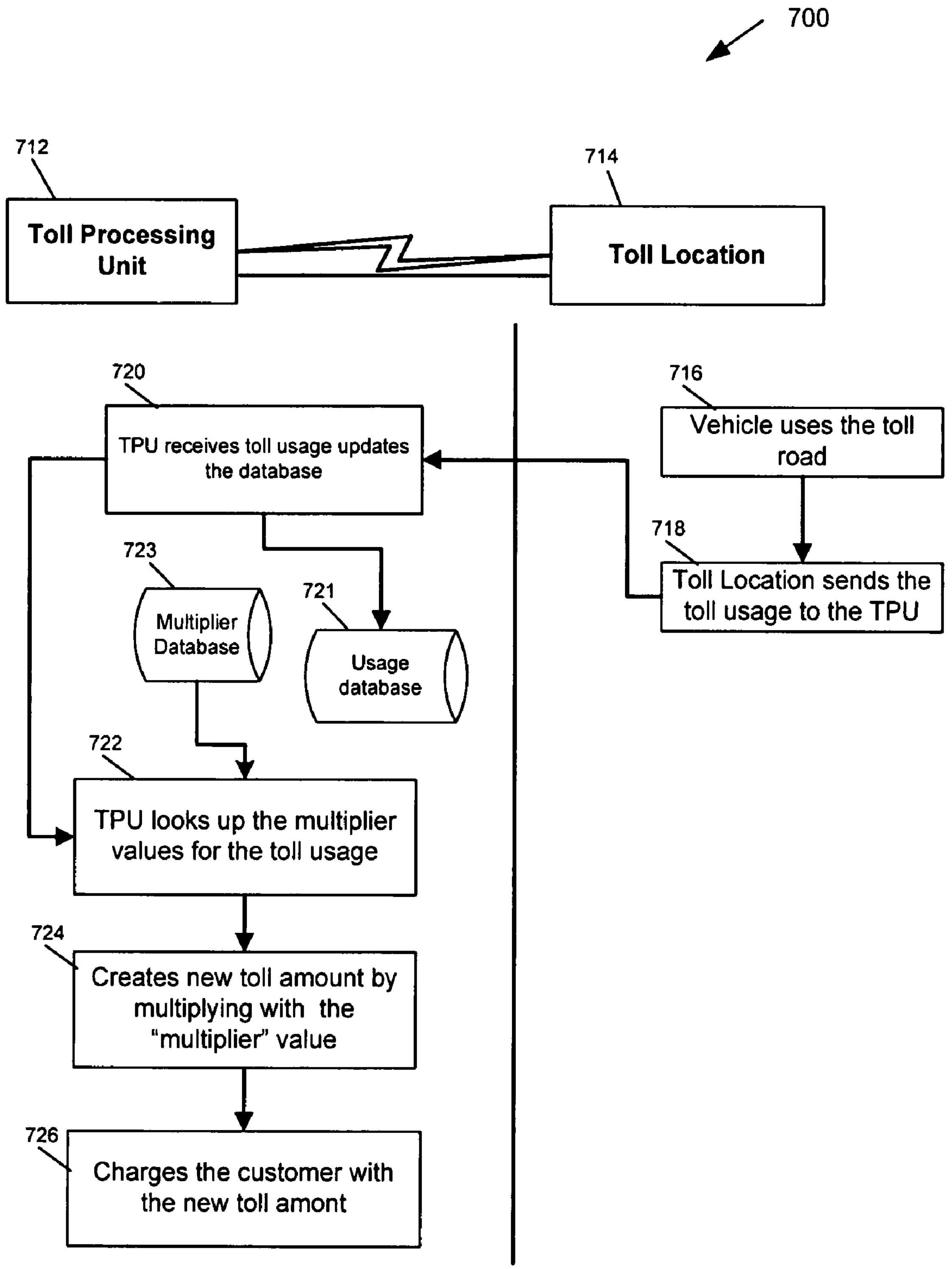
FIG. 7 illustrates a further system diagram according to an embodiment of the disclosure.

Referring now FIG. 7, a system 700 includes a TPU 712 and a toll location 714 that are communicably coupled to one another via a wired connection, a wireless connection, and/or a combination of the two. The toll location 714 captures the vehicle information when a vehicle uses the toll road 716 and sends 718 the toll usage information to the TPU 712 which receives 720 the toll usage information and updates the usage database 721. The TPU looks up the multiplier value based on the capture rate at the toll location 722. The TPU creates the toll amount using the following mechanism: Toll Amount=Original Toll Amount+1/(CR %*1)*[Original Toll Amount], where CR denotes a capture rate.

The system, method, and computer readable medium as described in accordance with embodiments of the present invention may be used to assure that the toll authority captures vehicle tolls using the VES system. The method and system provides means for the toll authority to maximize revenue when leveraging VES collection models for capturing vehicle tolls.

In one embodiment of the present invention, a method for determining a toll amount comprises determining a capture rate of transports at a toll location and determining the toll amount based on the capture rate. The toll location includes at least one of: a specific toll lane, a toll gate, a toll plaza, a wireless toll collection system, a toll region, and a toll system in its entirety. As such, varying rates can be provided for utilization of a single lane all the way to the entire system thus allowing variable pricing based on location or type of toll property used. Further, a "range" of minimum and maximum charges could be applied based on the location and/or the type of toll property used.

The method also comprises determining a multiplier value based on the capture rate of the toll location, wherein the determining the multiplier occurs after the determining the capture rate, determining the multiplier value by dividing 1 by the capture rate, determining the multiplier value by a following calculation: 1/(capture rate %*1), and billing the toll amount, wherein the capture rate is at least one of: detecting an unauthorized transport, detecting a percentage of unauthorized transports, and detecting a number of unauthorized transports, wherein the capture rate is determined by at least one of: a toll authority, a third party entity, a toll rental entity, an electronic device and a human being, wherein the capture is determined by at least one of: a manual process, an automatic process, a semi-automatic process, a static process, and a dynamic process.

The following example shows the revenue loss which occurs when the system according to the present invention is not being used to capture vehicle tolls:

Capture Rate=40%.

1000 Cars pass through VES system.

$1 is captured per toll

40% capture rate

Toll Authority Revenue=0.4*1000*$1

Toll Authority Revenue=400*$1=$400

Now the same variables will be used in accordance with the present invention which enables the toll authority to capture 100% of the VTOLLS.

1000 Cars pass through VES tolling system $1 is captured per toll

40% capture rate

Multiplier=2.5 (see table above for multiplier)

Toll Authority Revenue=0.4*1000*$1*2.5

Toll Authority Revenue=400*$1*2.5

Toll Authority Revenue=$400*2.5

Toll Authority Revenue=$1000

The formula for Total Toll Authority Revenue in the system according to the present invention is as follows:

TTAR=Total Toll Authority Revenue

X=Toll Capture Rate %

Y=Toll Gate Fee

Z=Actual Vehicles passing through Toll Gate

M=Multiplier for VTOLLS

TTAR=X*Y*Z*M

The formula for an individual Toll will be as follows:

ITR=Individual Toll Revenue

ITR=Y*M

For example in a Toll Authority where the Capture rate=40% (multiplier=2.5)

Toll Gate Fee=$1.00

ITR=$1.00*2.5

ITR=$2.50

In another embodiment of the present invention, a computer readable medium comprises instructions for: determining a capture rate of transports at a toll location, determining a multiplier, and determining a toll amount based on the capture rate and the multiplier, wherein the multiplier is based on the capture rate, determining a revenue amount based on the capture rate, a number of the transports at the toll location, a cost per transport for utilizing the toll location, and the multiplier, determining a revenue amount based on a following calculation: the capture rate*a number of the transports at the toll location*a cost per transport for utilizing the toll location*the multiplier, determining a revenue amount based on a cost per transport for utilizing the toll location and the multiplier, determining a revenue amount based on a following calculation: a cost per transport for utilizing the toll location*the multiplier, altering the multiplier if the capture rate is altered, and billing the toll amount.

In a further embodiment of the present invention, a system for determining a toll amount comprises a first entity that determines a capture rate of transports at a toll location, wherein the first entity is at least one of: a toll authority and a toll rental entity and a second entity that determines the toll amount based on the capture rate, wherein the second entity is at least one of: the toll authority and the toll rental entity. The toll amount is stored and/or the toll amount is billed by at least one of: the toll authority and the toll rental entity.

It should be realized that the embodiments of the present invention utilize a multiplier model based upon the video capture rate at various toll roads, toll gates, toll plazas or toll systems. As an example, a particular toll road such as, for example, the newer George Bush Turnpike may have a higher video capture rate compared to the older Dallas North Tollway. Thus, the present invention utilizes different multipliers based upon the video capture rate of the various toll roads. Using the multipliers allows for a greater percentage of actual tolls to be collected It is thus believed that the operation and system of the present invention will be apparent from the foregoing description and figures. While the method shown or described has been characterized as being preferred, it will be obvious that various changes and modifications may be made therein without departing from the spirit and scope of the invention.

What is claimed is:

1. A method for determining a toll amount, comprising:

determining a capture rate of transports at a toll location;

determining the toll amount based on a multiplier value;

determining via a toll processing unit, said multiplier value based on the capture rate of the toll location; and wherein the determining the multiplier occurs after the determining the capture rate.

2. The method of claim 1 comprising determining the multiplier value by dividing 1 by the capture rate.

3. The method of claim 1 comprising determining the multiplier value by a following calculation: 1/(capture rate % *1).

4. The method of claim 1 comprising billing the toll amount.

5. The method of claim 1, wherein the capture rate is at least one of:

detecting an unauthorized transport;

detecting a percentage of unauthorized transports; and detecting a number of unauthorized transports.

6. The method of claim 1, wherein the capture rate is determined by at least one of:

a toll authority;

a third party entity;

a toll rental entity;

an electronic device; and a human being.

7. The method of claim 1, wherein the capture rate is determined by at least one of:

a manual process;

an automatic process;

a semi-automatic process;

a static process; and a dynamic process.

8. A computer readable medium comprising instructions for:

determining a capture rate of transports at a toll location;

determining a multiplier based on the capture rate;

determining a toll amount based on the multiplier; and determining a revenue amount based on the capture rate, a number of the transports at the toll location, a cost per transport for utilizing the toll location, and the multiplier.

9. The computer readable medium of claim 8, wherein the multiplier is based on the capture rate.

10. The computer readable medium of claim 8 comprising instructions for determining the revenue amount based on a following calculation: the capture rate multiplied by the number of the transports at the toll location multiplied by the cost per transport for utilizing the toll location multiplied by the multiplier.

11. The computer readable medium of claim 8 comprising instructions for altering the multiplier if the capture rate is altered.

12. The computer readable medium of claim 8 comprising instructions for billing the toll amount.

13. A computer readable medium comprising instructions for:

determining a capture rate of transports at a toll location;

determining a multiplier based on the capture rate;

determining a toll amount based on the multiplier;

determining a revenue amount based on a cost per transport for utilizing the toll location and the multiplier.

14. A system for determining a toll amount, comprising:

a first entity that determines a capture rate of transports at a toll location and a multiplier based on the capture rate, wherein the first entity is at least one of: a toll authority and a toll collection entity; and a second entity that determines the toll amount based on the multiplier, wherein the second entity is at least one of: the toll authority and the toll collection entity; and wherein the second entity is adapted to determine a revenue amount based on the capture rate, a number of the transports at the toll location, a cost per transport for utilizing the toll location, and the multiplier.

15. The system of claim 14, wherein the toll amount is stored by at least one of: the toll authority and the toll collection entity.

16. The system of claim 14, wherein the toll amount is billed by at least one of: the toll authority and the toll collection entity.

17. A computer readable medium comprising instructions for:

determining a capture rate of transports at a toll location;

determining a multiplier based on the capture rate;

determining a toll amount based on the multiplier; and determining a revenue amount based on a following calculation: a cost per transport for utilizing the toll location multiplied by the multiplier.

18. A computer readable medium comprising instructions for:

determining a capture rate of transports at a toll location;

determining a multiplier based on the capture rate;

determining a toll amount based on the multiplier; and altering the multiplier if the capture rate is altered.

* * * * *

UNITED STATES PATENT AND TRADEMARK OFFICE

CERTIFICATE OF CORRECTION

PATENT NO. : 7,501,961 B2
APPLICATION NO. : 11/803933
DATED : March 10, 2009
INVENTOR(S) : Benjamin P. Robinson et al.

It is certified that error appears in the above-identified patent and that said Letters Patent is hereby corrected as shown below:

Title page, item [56]
In the REFERENCES CITED, please insert:

| | | |
|---|---|---|
| --US 6,052,068 A | 04/2000 | Price R-W et al. |
| US 7,104,447 A | 09/2006 | Lopez et al. |
| US 6,344,806 A | 02/2002 | Katz-- |

Title page, item [56]
In OTHER PUBLICATIONS, please insert:

--Young, Lee W., "International Search Report for PCT/US 08/10258" as mailed November 10, 2008 (3 pages)--

Signed and Sealed this

First Day of September, 2009

David J. Kappos

*Director of the United States Patent and Trademark Office*